(12) United States Patent
Li

(10) Patent No.: US 11,791,680 B2
(45) Date of Patent: Oct. 17, 2023

(54) MAGNET SPACER AND MOTOR

(71) Applicant: Otis Elevator Company, Farmington, CT (US)

(72) Inventor: YaTao Li, Tianjin (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 329 days.

(21) Appl. No.: 17/097,994

(22) Filed: Nov. 13, 2020

(65) Prior Publication Data
US 2021/0351672 A1 Nov. 11, 2021

(30) Foreign Application Priority Data
May 8, 2020 (CN) .......................... 202010381062.7

(51) Int. Cl.
| | |
|---|---|
| *H02K 1/18* | (2006.01) |
| *H02K 1/2791* | (2022.01) |
| *H02K 1/274* | (2022.01) |
| *H02K 15/03* | (2006.01) |

(52) U.S. Cl.
CPC ............. *H02K 1/2791* (2022.01); *H02K 1/18* (2013.01); *H02K 1/274* (2013.01); *H02K 15/03* (2013.01)

(58) Field of Classification Search
CPC .......... H02K 15/03; H02K 1/18; H02K 1/274; H02K 1/278; H02K 2201/06; H02K 1/2786; Y10T 29/49009
See application file for complete search history.

(56) References Cited

U.S. PATENT DOCUMENTS

| | | | |
|---|---|---|---|
| 5,907,206 A | 5/1999 | Shiga et al. | |
| 8,102,092 B2 * | 1/2012 | Tomohara | ............ H02K 15/022 310/216.008 |
| 2014/0084734 A1 * | 3/2014 | Ishigami | .............. H02K 1/2773 29/598 |

FOREIGN PATENT DOCUMENTS

JP 2014003795 A 1/2014

OTHER PUBLICATIONS

European Search Report for Application No. 20215820.0; dated May 31, 2021; 8 Pages.

\* cited by examiner

*Primary Examiner* — Donghai D Nguyen
(74) *Attorney, Agent, or Firm* — CANTOR COLBURN LLP

(57) ABSTRACT

A magnet spacer and a motor. The magnet spacer includes: a first engagement portion being configured to extend along a first axis; and a second engagement portion being configured to extend along a second axis and configured to be integrally formed with the first engagement portion; wherein a predetermined angle is formed between the first axis and the second axis; wherein the shape of the first engagement portion is configured to match the shape of a recess in a motor rotor; and wherein the side shape of the second engagement portion is configured to match the side shape of a motor magnet.

10 Claims, 3 Drawing Sheets

MAGNET SPACER AND MOTOR

FOREIGN PRIORITY

This application claims priority to Chinese Patent Application No. 202010381062.7, filed May 8, 2020, and all the benefits accruing therefrom under 35 U.S.C. § 119, the contents of which in its entirety are herein incorporated by reference.

FIELD OF THE INVENTION

The present application relates to the field of motor structure. More specifically, the present application relates to a magnet spacer, which is intended to provide convenient and flexible assembling of motor magnets. The present application also relates to a motor including the above magnet spacer.

BACKGROUND ART

For a motor in which a stator is mounted on a motor axis and a rotor is arranged to rotate around the motor axis, motor magnets need to be mounted onto the rotor in the circumferential direction of the rotor. For example, a plurality of motor magnets may be arranged on a certain cross section of the rotor. Conventional motor magnets are generally fixed by means of glue and mechanical fixation. Glue may be adhesives that need to be cured at high temperatures, while mechanical fixation is generally achieved with components such as bolts.

However, conventional magnet fixing solutions are disadvantageous for automated assembling and often require manual operations. Therefore, there is an ongoing need for new motor magnet assembling solutions. It is desired that the new solution can alleviate the above problem at least to some extent.

SUMMARY OF THE INVENTION

An object of one aspect of the present application is to provide a magnet spacer, which provides better automated assembling solution while ensuring that motor magnets are fixed. An object of another aspect of the present application is to provide a motor including the above magnet spacer.

The objects of the present application are achieved by the following technical solutions.

A magnet spacer, which includes: a first engagement portion being configured to extend along a first axis; a second engagement portion being configured to extend along a second axis and configured to be integrally formed with the first engagement portion; wherein a predetermined angle is formed between the first axis and the second axis; wherein the shape of the first engagement portion is configured to match the shape of a recess in a motor rotor; and wherein the side shape of the second engagement portion is configured to match the side shape of a motor magnet.

In the above magnet spacer, optionally, the first engagement portion is configured to have a cross section along the first axis, which has one of the following shapes: a part of a circle, a part of an ellipse, a part of a parabola, a dovetail, or a combination thereof.

In the above magnet spacer, optionally, the side of the first engagement portion that is close to the second engagement portion has a planar shape.

In the above magnet spacer, optionally, the second engagement portion is configured to have a cross section along the second axis, which has one of the following shapes: a wedge, a parallelogram, a trapezoid, a dovetail, or a combination thereof.

In the above magnet spacer, optionally, the side of the second engagement portion that is close to the first engagement portion has a planar shape, and the side of the second engagement portion that is away from the first engagement portion has a larger size than the side of the second engagement portion that is close to the first engagement portion.

In the above magnet spacer, optionally, a predetermined angle between 0 and 30 degrees is formed between the first axis and the second axis.

In the above magnet spacer, optionally, the first engagement portion and the second engagement portion are configured to be made of one of the following materials: aluminum alloy, and non-metallic material.

In the above magnet spacer, optionally, the extension length of the first engagement portion along the first axis is larger than the extension length of the second engagement portion along the second axis.

A motor, which includes: a motor stator, which is configured to extend along a motor axis; a motor rotor, which is arranged around the motor stator with the motor axis as the center, and the surface of the motor rotor facing the motor stator is provided with a plurality of axially extending recesses in the circumferential direction; a plurality of the magnet spacers described above, which are attached to each of the recesses through the first engagement portions; and a plurality of motor magnets, which are engaged between two adjacent magnet spacers respectively and attached to the motor rotor; and wherein the motor axis and the first axis are substantially in the same orientation.

In the above motor, optionally, the motor magnets are also attached to the motor rotor by an adhesive.

The magnet spacer and the motor of the present application have the advantages of being simple and reliable, easy to implement, convenient to use, etc. The automated and rapid assembling of the motor could be achieved, while providing good mechanical stability.

BRIEF DESCRIPTION OF THE DRAWINGS

The present application will be described below in further detail with reference to the accompanying drawings and preferred embodiments. Those skilled in the art will appreciate that these drawings are drawn only for the purpose of explaining the preferred embodiments, and therefore should not be construed as limiting the scope of the present application. In addition, unless specifically stated, the drawings are only intended to conceptually represent the composition or construction of the described objects and may contain exaggerated illustration. The drawings are not necessarily drawn to scale.

DETAILED DESCRIPTION OF THE EMBODIMENT(S) OF THE INVENTION

Figure 1:
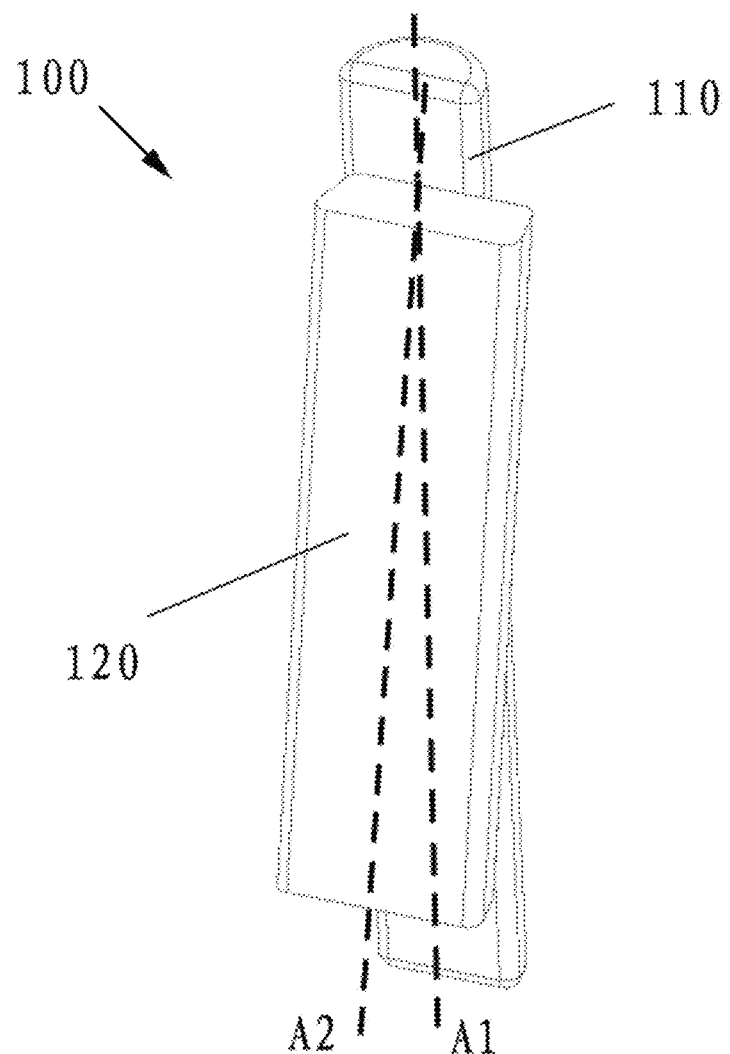
FIG. 1 is a schematic perspective view of the magnet spacer according to one embodiment of the present application.

Hereinafter, preferred embodiments of the present application will be described in detail with reference to the accompanying drawings. Those skilled in the art will appreciate that these descriptions are merely illustrative and exemplary, and should not be construed as limiting the scope of protection of the present application.

Firstly, it should be noted that the orientational terms such as top, bottom, upward, and downward mentioned herein are defined with respect to the directions in various drawings. These orientational terms are relative concepts, and therefore will change with the position and state thereof. Accordingly, these or other orientational terms should not be interpreted as restrictive.

In addition, it should also be noted that for any single technical feature described or implied in the embodiments herein, or any single technical feature shown or implied in the drawings, it is still possible to combine these technical features (or their equivalents) so as to obtain other embodiments that are not directly mentioned herein.

It should be noted that in different drawings, identical or substantially identical components are denoted by identical reference numbers.

As used herein, the axial direction indicates the direction of the rotation axis of the motor, the radial direction indicates the direction of a radial line which travels from a point on the rotation axis of the motor in the plane perpendicular to the rotation axis of the motor, and the circumferential direction indicates the direction of a circle in a plane perpendicular to the rotation axis of the motor with the point on the rotation axis of the motor as the center.

FIG. 1 is a schematic perspective view of a magnet spacer according to one embodiment of the present application. The magnet spacer 100 is consisted of a first engagement portion 110 and a second engagement portion 120.

The first engagement portion 110 may be configured as an elongated member extending substantially along a first axis A1. In the illustrated embodiment, the first engagement portion 110 has a first cross section along the first axis A1, and the first cross section may be configured in a substantially C-shape. For example, the side of the first cross section that is away from the second engagement portion 120 may be configured to have a curved or C-shaped profile, and the side of the first cross section that is close to the second engagement portion 120 may be configured to be substantially planar. It is easy to understand that each edge portion of the first engagement portion 110 may actually be configured to be rounded in order to provide a smooth transition in profile.

In addition to the illustrated shape, the first cross section may also be configured to have other shapes, including but not limited to a part of a circle (e.g., a semicircle), a part of an ellipse, a part of a parabola, a dovetail, or a combination thereof.

The first cross section is configured to match with the shape of the recess in the motor rotor (not shown), so that the magnet spacer 100 is in close contact with and attached to the motor rotor. The specific engagement method will be described in detail below.

The second engagement portion 120 may also be configured as an elongated member extending substantially along a second axis A2. In the illustrated embodiment, the second engagement portion 120 has a second cross section along the second axis A2. The side shape of the second cross section is configured to match the side shape of a motor magnet. For example, the second cross section may be configured to have one of the following shapes: a wedge, a parallelogram, a trapezoid, a dovetail, or a combination thereof. Whatever shape the second cross section has, it is desirable that the side shape of the second cross section is configured to match the side shape of the motor magnet. Similarly, each edge portion of the second engagement portion 120 may also be configured to be rounded in order to provide a smooth transition in profile.

In addition, the side of the second engagement portion 120 that is close to the first engagement portion 110 may be configured into a planar shape so as to match the planar shape of the side of the first engagement portion 110 that is close to the second engagement portion 120. In addition, the side of the second engagement portion 120 that is away from the first engagement portion 110 may also be configured into a planar shape.

In some embodiments, the size of the side of the second engagement portion 120 that is away from the first engagement portion 110 is larger than the size of the side of the second engagement portion 120 that is close to the first engagement portion 110. For example, in the case where the second cross section has a trapezoidal shape or a dovetail shape, the above relative dimensional relationship may be formed.

The second engagement portion 120 may be configured to be integrally connected with the first engagement portion 110. For example, the first engagement portion 110 and the second engagement portion 120 may be integrally formed by process such as casting, or may be attached together by process such as welding after being separately manufactured.

A predetermined angle may be formed between the first axis A1 and the second axis A2 as required. For example, the predetermined angle may be between 0 and 30 degrees, including but not limited to 5 degrees, 10 degrees, 15 degrees, 20 degrees, 25 degrees, 30 degrees, or any other suitable angle. Forming the predetermined angle between the first axis A1 and the second axis A2 is to match the direction in which the motor magnets are arranged.

The first engagement portion 110 and the second engagement portion 120 may be made of any suitable material, including but not limited to aluminum alloy or non-metallic material, etc. The first engagement portion 110 and the second engagement portion 120 may be made of the same material, or may be made of different materials.

As shown in the drawings, the extension length of the first engagement portion 110 along the first axis A1 is larger than the extension length of the second engagement portion 120 along the second axis A2. The geometric centers of the first engagement portion 110 and the second engagement portion 120 may be located substantially at the same height in FIG. 1, and therefore, the first engagement portion 110 protrudes beyond the second engagement portion 120 at both ends of the second engagement portion 120. In other words, the first engagement portion 110 may extend out of both ends of the second engagement portion 120.

Figure 2:
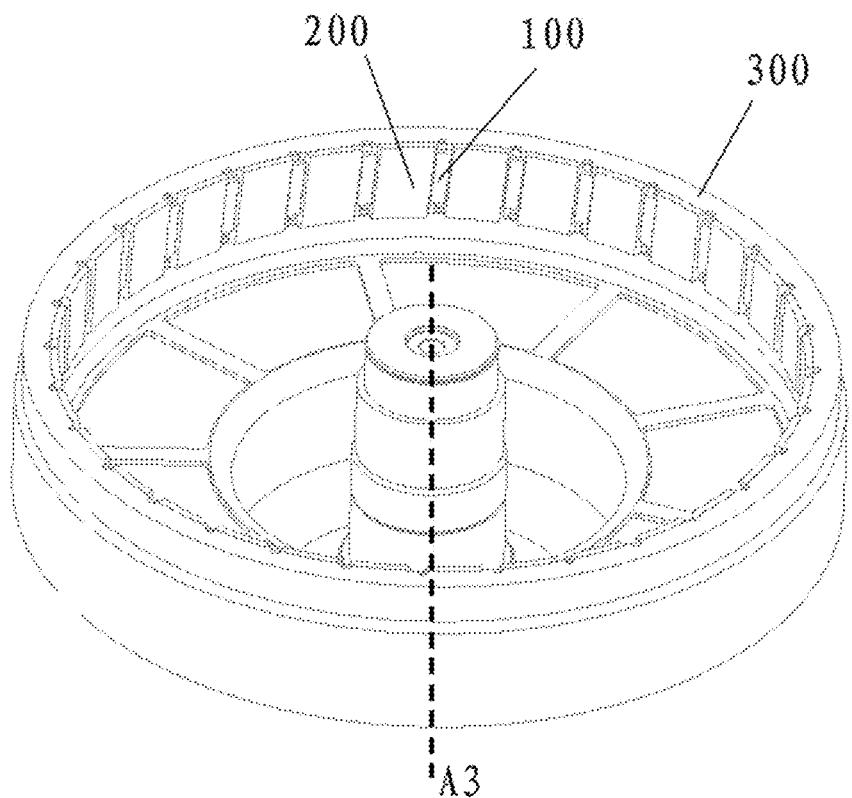
FIG. 2 is a schematic structural view of the motor rotor according to one embodiment of the present application.
Figure 3:
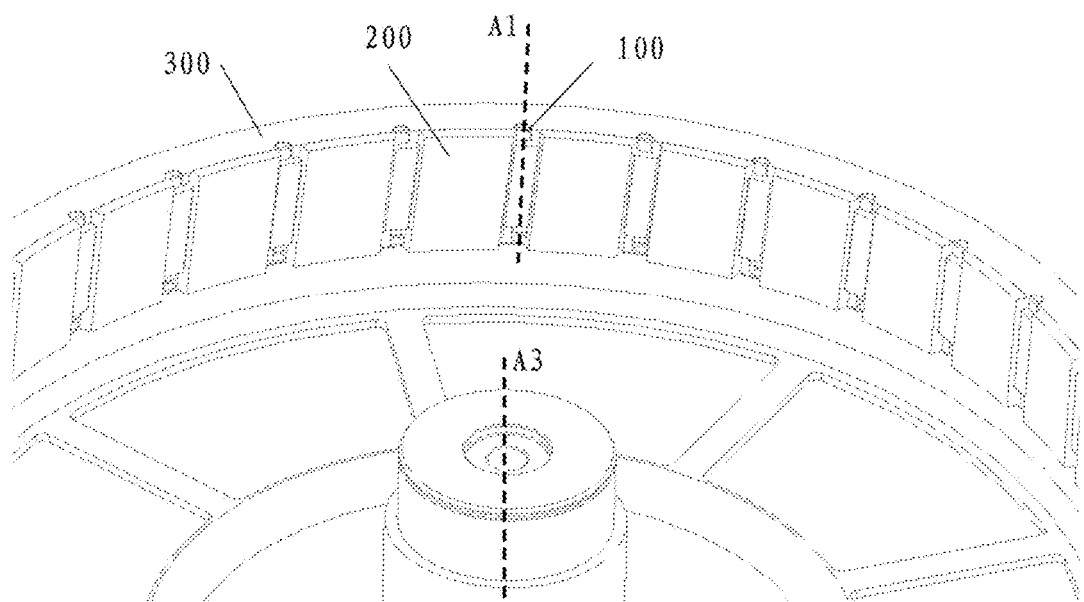
FIG. 3 is a partially enlarged view of FIG. 2.
Figure 4:
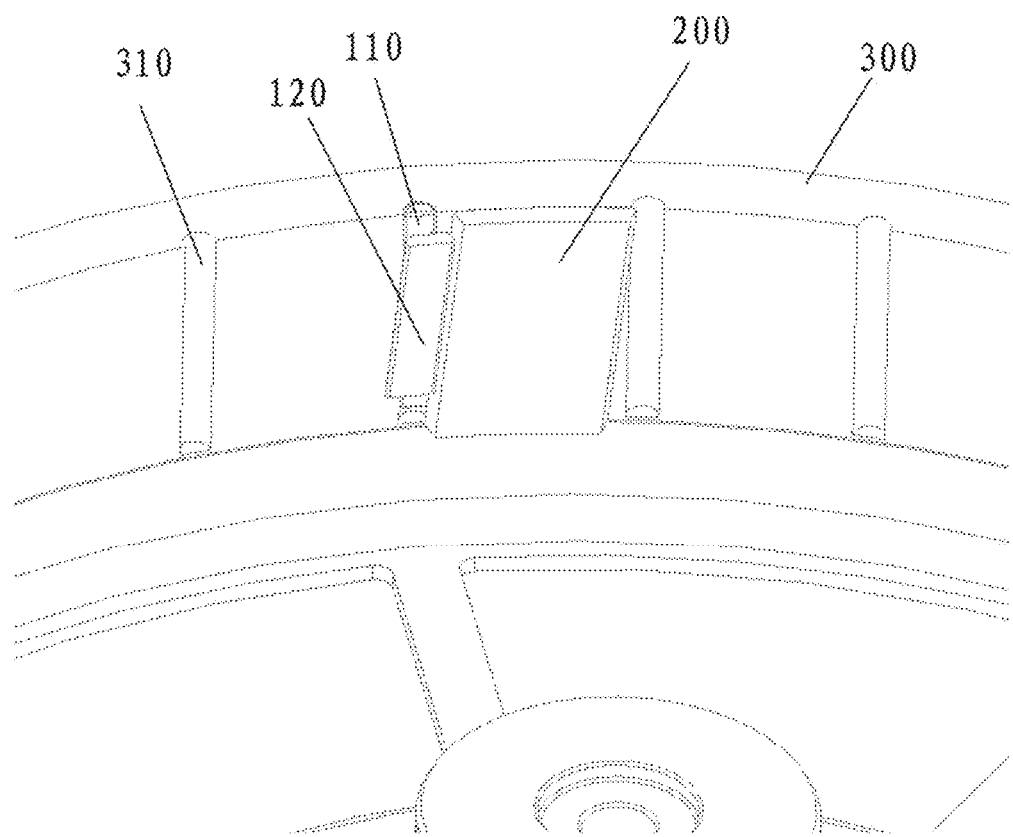
FIG. 4 is a partial enlarged view of FIG. 3.

FIG. 2 is a schematic structural view of a motor rotor according to one embodiment of the present application, FIG. 3 is a partially enlarged view of FIG. 2, and FIG. 4 is a partially enlarged view of FIG. 3. For the sake of clarity, some components in the motor are omitted in FIGS. 2 to 4.

The motor includes at least the following components: a motor stator (not shown), a motor rotor 300, a plurality of magnet spacers 100 as described above, and a plurality of motor magnets 200.

The motor stator is configured to extend along a motor axis A3, and the motor rotor 300 is configured to be arranged around the motor stator with the motor axis A3 as the center, and is rotatable around the motor axis A3. As shown in FIG. 4, a plurality of recesses 310 are arranged on the side of the motor rotor 300 that faces the motor stator. Each of the recesses 310 are substantially evenly distributed on the motor rotor in the circumferential direction, and are configured to extend substantially parallel to the motor axis A3.

Each of the recesses 310 matches the shape of the first engagement portions 110 of the magnet spacers 100, respectively. Therefore, the first engagement portions 110 may be mounted at each of the recesses 310, and a plurality of magnet spacers 100 may be arranged in the circumferential direction of the motor rotor 300. Since the recess 310 may be configured to extend substantially along the motor axis A3, when mounted in place, the first axis A1 of the first engagement portion 110 of the magnet spacer 100 is also arranged substantially parallel to the motor axis A3 or in the same orientation as the motor axis A3.

A plurality of motor magnets 200 are mounted between the adjacent magnet spacers 100, and the side shape of the motor magnet 200 is configured to match the shape of the second engagement portion 120 of the magnet spacer 100. For example, in the case where the magnet spacer 100 has a substantially trapezoidal second cross section shown in FIG. 1, the motor magnet 200 may have an inverted trapezoid shape matching the second cross section, so that the motor magnet 200 may be tightly engaged and fixed by the second engagement portions 120 of the adjacent magnets 100.

In addition, adhesive may be arranged on the side of the motor magnet 200 that faces the motor rotor 300, so as to fix the motor magnet 200 to the motor rotor 300. The adhesive may be any suitable type of adhesive material, and an adhesive that does not require high-temperature curing may be applied, so as to achieve automated manufacturing and assembling.

In addition, the motor magnet 200 may be configured to have a parallelogram shape shown in FIG. 4, such that the ends of the motor magnet 200 can extend over the recesses 310 on both sides. For example, in the embodiment shown in FIG. 4, the lower left corner portion and the upper right corner portion of the motor magnet 200 extend over the recesses 310, respectively. This enables the motor magnet 200 to also assist in fixing the magnet spacers 100.

During the assembling, the motor magnet 200 may be mechanically fixed to the rotor 300 through the adjacent magnet spacers 100 in sequence, and the motor magnet 200 is also attached to the rotor 300 by adhesive. In this case, the magnet spacer 100 functions as the primary connection, and the adhesive functions as the secondary connection. By applying the technical solutions of the present application, the motor can be manufactured by an automated production line, and there is no need to heat the adhesive for bonding the magnet spacer and the motor according to the present application during the manufacturing process, thereby reducing the need for heating furnace. In addition, the magnet spacer and the motor according to the present application improve the efficiency of work and manufacturing, and reduce the labor and time cost of manufacturing.

The present description discloses the present application reference to the accompanying drawings, and enables those skilled in the art to implement the present application, including manufacturing and using any device or system, selecting suitable materials, and using any combined method. The scope of the present application is defined by the claimed technical solutions, and contains other examples that can be conceived by those skilled in the art. Such other examples should be considered as falling within the scope of protection defined by the technical solutions claimed in the present application, as long as such other examples include structural elements that are not different from the literal language of the claimed technical solutions, or such other examples include equivalent structural elements that are not substantively different from the literal language of the claimed technical solutions.

What is claimed is:

1. A magnet spacer characterized in that it comprises:
   a first engagement portion being configured to extend along a first axis;
   a second engagement portion being configured to extend along a second axis and configured to be integrally formed with the first engagement portion;
   wherein a predetermined angle is formed between the first axis and the second axis;
   wherein an extension length of the first engagement portion along the first axis is larger than an extension length of the second engagement portion along the second axis;
   wherein the shape of the first engagement portion is configured to match the shape of a recess in a motor rotor; and
   wherein the side shape of the second engagement portion is configured to match the side shape of a motor magnet.

2. The magnet spacer according to claim 1, wherein the first engagement portion is configured to have a cross section along the first axis, which has one of the following shapes: a part of a circle, a part of an ellipse, a part of a parabola, a dovetail, or a combination thereof.

3. The magnet spacer according to claim 2, wherein the side of the first engagement portion that is close to the second engagement portion has a planar shape.

4. The magnet spacer according to claim 1, wherein the second engagement portion is configured to have a cross section along the second axis, which has one of the following shapes: a wedge, a parallelogram, a trapezoid, a dovetail, or a combination thereof.

5. The magnet spacer according to claim 4, wherein the side of the second engagement portion that is close to the first engagement portion has a planar shape, and the side of the second engagement portion that is away from the first engagement portion has a larger size than the side of the second engagement portion that is close to the first engagement portion.

6. The magnet spacer according to claim 1, wherein a predetermined angle between 0 and 30 degrees is formed between the first axis and the second axis.

7. The magnet spacer according to claim 1, wherein the first engagement portion and the second engagement portion are configured to be made of one of the following materials: aluminum alloy, and non-metallic material.

8. A motor characterized in that it comprises:
   a motor stator being configured to extend along a motor axis;
   a motor rotor being arranged around the motor stator with the motor axis as the center, and the face of the motor rotor facing the motor stator is provided with a plurality of axially extending recesses in the circumferential direction;
   a plurality of the magnet spacers according to claim 1 being attached to the respective recesses through the first engagement portions; and
   a plurality of motor magnets being engaged between two adjacent magnet spacers respectively and attached to the motor rotor; and
   wherein the motor axis and the first axis are substantially in the same orientation.

9. The motor according to claim 8, wherein the motor magnets are also attached to the motor rotor by an adhesive.

10. The motor according to claim 8, wherein the first engagement portion is located radially outwardly of the second engagement portion.

\* \* \* \* \*